US012518771B2

(12) United States Patent
Sung et al.

(10) Patent No.: US 12,518,771 B2
(45) Date of Patent: Jan. 6, 2026

(54) METHODS OF ENCODING AND DECODING AUDIO SIGNAL USING NEURAL NETWORK MODEL, AND DEVICES FOR PERFORMING THE METHODS

(71) Applicant: Electronics and Telecommunications Research Institute, Daejeon (KR)

(72) Inventors: Jongmo Sung, Daejeon (KR); Seung Kwon Beack, Daejeon (KR); Mi Suk Lee, Daejeon (KR); Tae Jin Lee, Daejeon (KR); Woo-taek Lim, Daejeon (KR); Inseon Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1166 days.

(21) Appl. No.: 17/368,484

(22) Filed: Jul. 6, 2021

(65) Prior Publication Data

US 2022/0005488 A1   Jan. 6, 2022

(30) Foreign Application Priority Data

Jul. 6, 2020 (KR) .................. 10-2020-0083079
Apr. 20, 2021 (KR) .................. 10-2021-0052262

(51) Int. Cl.
*G10L 19/032* (2013.01)
*G06N 3/044* (2023.01)
(Continued)

(52) U.S. Cl.
CPC ............ *G10L 19/032* (2013.01); *G06N 3/044* (2023.01); *G06N 3/0455* (2023.01); *G06N 3/08* (2013.01);
(Continued)

(58) Field of Classification Search
None
See application file for complete search history.

(56) References Cited

U.S. PATENT DOCUMENTS 6,934,676 B2    8/2005  Wang et al.
8,484,022 B1    7/2013  Vanhoucke
(Continued)

FOREIGN PATENT DOCUMENTS

CN      108256626 A  *  7/2018  ............ G06N 3/045
KR    1020190049552 A      5/2019
(Continued)

OTHER PUBLICATIONS

Yang Yang, Guillaume Sautière, J. Jon Ryu, Taco S Cohen; Feedback Recurrent AutoEncoder; Feb. 17, 2020; URL: https://arxiv.org/pdf/1911.04018 (Year: 2020).*

(Continued)

*Primary Examiner* — Richa Sonifrank
(74) *Attorney, Agent, or Firm* — WILLIAM PARK AND ASSOCIATES LTD.

(57) ABSTRACT

The encoding method includes computing the first feature information of an input signal using a recurrent encoding model, quantizing the first feature information and producing the first feature bitstream, computing the first output signal from the quantized first feature information using a recurrent decoding model, computing the second feature information of the input signal using a nonrecurrent encoding model, quantizing the second feature information and producing the second feature bitstream, computing the second output signal from the quantized second feature information using a nonrecurrent decoding model, determining an encoding mode based on the input signal, the first and second output signals, and the first and second feature bitstreams, and outputting an overall bitstream by multiplexing an encoding mode bit and one of the first feature bitstream and the second feature bitstream depending on the encoding mode.

16 Claims, 7 Drawing Sheets

(51) Int. Cl.
*G06N 3/045* (2023.01)
*G06N 3/0455* (2023.01)
*G06N 3/08* (2023.01)
*G06N 3/088* (2023.01)
*G10L 19/06* (2013.01)
*G10L 19/08* (2013.01)
*G10L 19/16* (2013.01)
*G10L 19/18* (2013.01)
*G10L 19/22* (2013.01)
*H04B 17/309* (2015.01)

(52) U.S. Cl.
CPC .............. *G10L 19/06* (2013.01); *G10L 19/08* (2013.01); *G10L 19/167* (2013.01); *G10L 19/18* (2013.01); *G10L 19/22* (2013.01); *H04B 17/309* (2015.01); *G06N 3/045* (2023.01); *G06N 3/088* (2013.01)

(56) References Cited

U.S. PATENT DOCUMENTS

| | | | |
|---|---|---|---|
| 2019/0045226 A1* | 2/2019 | Xu | H04N 19/124 |
| 2019/0164052 A1 | 5/2019 | Sung et al. | |
| 2020/0111501 A1 | 4/2020 | Sung et al. | |
| 2022/0138992 A1* | 5/2022 | Wu | H04N 19/63 |
| | | | 382/232 |
| 2022/0270623 A1* | 8/2022 | Liang | G10L 25/30 |

FOREIGN PATENT DOCUMENTS

| | | |
|---|---|---|
| KR | 1020190096281 A | 8/2019 |
| KR | 1020200039530 A | 4/2020 |

OTHER PUBLICATIONS

Yang Yang et al., Feedback Recurrent Autoencoder, International Conference on Acoustics, Speech and Signal Processing (ICASSP) 2020, IEEE, pp. 3347-3351.

* cited by examiner

METHODS OF ENCODING AND DECODING AUDIO SIGNAL USING NEURAL NETWORK MODEL, AND DEVICES FOR PERFORMING THE METHODS

CROSS-REFERENCE TO RELATED APPLICATION(S)

This application claims the priority benefit of Korean Patent Application No. 10-2020-0083079 filed on Jul. 6, 2020, and Korean Patent Application No. 10-2021-0052262 filed on Apr. 22, 2021, in the Korean Intellectual Property Office, the disclosures of which are incorporated herein by reference for all purposes.

BACKGROUND

1. Field

One or more example embodiments relate to an audio signal encoding and decoding method using a neural network model and an encoder and a decoder performing the method, and more particularly, to a technology for effectively removing short-term redundancy and long-term redundancy when encoding and decoding an audio signal.

2. Description of Related Art

In general, a sequential signal such as in a text, a speech, an audio, and a video may have short-term redundancy and long-term redundancy. Thus, fix highly efficient compression of such a sequential signal as in a text, a speech, an audio, and a video, it may need to remove short-term redundancy and long-term redundancy simultaneously.

For example, most code-excited linear prediction (CELP)-based speech signal compression methods may remove long-term redundancy using a pitch filter and remove short-term redundancy using a linear prediction filter. For another example, video compression methods may remove long-term redundancy and short-term redundancy through an inter-frame prediction and an intra-frame prediction using a motion vector.

Among typical neural network-based signal compression methods, an encoding and decoding method using a dimensionality reduction-based autoencoder may effectively encode and decode a non-sequential signal as in a still image. However, this encoding and decoding method may not be effective in encoding and decoding a sequential signal such as an audio signal and a video signal that include long-term redundancy. Also, using a recurrent neural network (RNN), which is another type of neural network, may be effective in representing long-term redundancy. However, it may be relatively ineffective in removing short-term redundancy included in frames.

Thus, there is a need for a coding technology to effectively remove long-term redundancy and short-term redundancy included in an audio signal.

SUMMARY

An aspect provides a method and device for effectively removing long-term redundancy and short-term redundancy when encoding and decoding an audio signal.

According to an example embodiment, there is provided an encoding method including computing the first feature information of an input signal using a recurrent encoding model, quantizing the first feature information, computing the first output signal from the quantized first feature information using a recurrent decoding model, computing the second feature information of the input signal using a nonrecurrent encoding model, quantizing the second feature information, determining an encoding mode based on the input signal and the quantized first and second feature information, and outputting a combined bitstream of the feature information and the encoding mode according to the encoding mode.

The recurrent encoding model may encode a current frame of the input signal using accumulated history information about previous frames of the input signal at each time step. The recurrent decoding model may reconstruct the current fame of the input signal by decoding the first feature information of the current frame using the history information about the previous frames of the input signal at each time step.

In detail, the recurrent decoding model may update the history information at a current time step using the history information at the previous time step and the first feature information of the current frame, and then compute the first output signal using the updated history information.

The history information at each time step may be used to model long-term redundancy for previous frames using a recurrent neural network, and be shared between the recurrent encoding model and the recurrent decoding model.

To this end, the encoding method may internally include a recurrent decoding operation in addition to such a recurrent encoding operation described in the foregoing. The updated history information at the current time step may be stored to be used as previous history information for encoding a frame at the next time step.

The determining of the encoding mode may be performed using a closed-loop method using an input signal of an encoder and an output signal internally reconstructed in the encoder, or an open-loop method using solely features of the input signal without signal reconstruction in the encoder.

The determining of the encoding mode by the closed-loop method may include computing the second output signal from the quantized second feature information using a nonrecurrent decoding model, calculating the first loss as a weighted sum of a signal distortion between the input signal and the first output signal and an entropy, that is a required number of bits to encode the first feature information into a bitstream, calculating the second loss as a weighted sum signal distortion between the input signal and the second output signal and an entropy for the second feature information, comparing the first loss and the second loss, and determining the encoding mode as mode having a smaller loss one of a recurrent mode and a nonrecurrent mode.

The determining of the encoding mode by the open-loop method may include selecting a mode which have a dominant redundancy of long-term redundancy and short-term redundancy inherently included in the input signal.

The selection of the mode may include a parameter extracting operation of calculating a single or a plurality of feature parameters from the input signal, and a mode selection operation of determining the encoding mode to be one of the recurrent mode and the nonrecurrent mode based on calculated feature parameter(s).

As the feature parameter(s) for open-loop mode selection, a frame energy, a frame zero-crossing rate (VCR), a pitch delay, and a gain of a long-term prediction filter may be used.

According to an example embodiment, there is provided a decoding method including extracting an encoding mode from a bitstream received from the encoder, reconstructing the quantized feature information of an input signal by dequantizing a feature information bitstream extracted from the bitstream received from the encoder, and computing an output signal from the quantized feature information using a recurrent decoding model or a nonrecurrent decoding model depending on the encoding mode.

In case of the encoding mode being a recurrent mode, the reconstructing of the output signal may include computing the output signal from the quantized feature information using the recurrent decoding model.

The recurrent decoding model may update a history information using the history information at the previous time step and the quantized feature information, and compute the output signal from the updated history information. The updated history information may be stored to decode a feature information using the recurrent decoding model at the next time step.

In case of the encoding mode being a nonrecurrent mode, the reconstructing of the output signal may include computing the output signal from the quantized feature information using the nonrecurrent decoding model. To deal with updating the history information for recurrent mode decoding at subsequent time steps, the reconstructing of the output signal may additionally include computing the first feature information for the output signal using the recurrent encoding model, quantizing the first feature information, and updating a history information using history information at the previous time step and the quantized first feature information by using the recurrent decoding model.

According to an example embodiment, there is provided an encoder configured to perform an encoding method, the encoder including a processor. The processor may compute the first feature information of an input signal using a recurrent encoding model, quantize the first feature information, compute the first output signal from the quantized first feature information using a recurrent decoding model, compute the second feature information of the input signal using a nonrecurrent encoding model, quantize the second feature information, determine an encoding mode based on the input signal and the quantized first and second feature information, and output a bitstream of feature information and the encoding mode bit according to the encoding mode.

According to an example embodiment, there is provided a decoder configured to perform a decoding method, the decoder including a processor. The processor may extract an encoding mode from a bitstream received from the encoder, reconstruct the quantized feature information of an input signal by dequantizing a feature information bitstream extracted from the bitstream received from the encoder, and compute an output signal from the quantized feature information using a recurrent decoding model or a nonrecurrent decoding model depending on the encoding mode.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
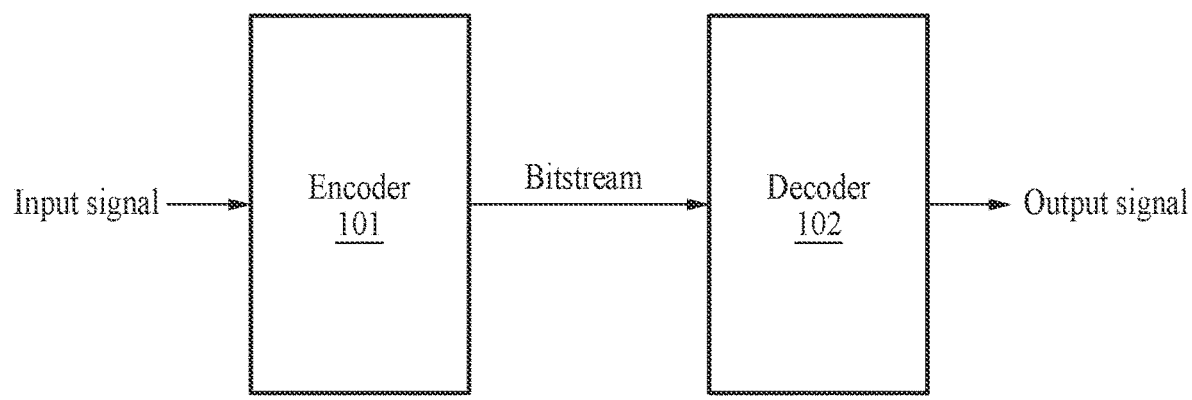
FIG. 1 is a diagram illustrating an example of an encoder and an example of a decoder according to an example embodiment.

Hereinafter, example embodiments will be described in detail with reference to the accompanying drawings. However, various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In the description of example embodiments, detailed description of structures or functions that are thereby known after an understanding of the disclosure of the present application will be omitted when it is deemed that such description will cause ambiguous interpretation of the example embodiments.

In addition, terms such as first, second, A, B, (a), (b), and the like may be used herein to describe components. Each of these terminologies is not used to define an essence, order, or sequence of a corresponding component but used merely to distinguish the corresponding component from other component(s). Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Hereinafter, example embodiments will be described in detail with reference to the accompanying drawings. Regarding the reference numerals assigned to the elements in the drawings, it should be noted that the same elements will be designated by the same reference numerals, wherever possible, even though they are shown in different drawings.

FIG. 1 is a diagram illustrating an example of an encoder and an example of a decoder according to an example embodiment.

The present disclosure relates to a technology for effectively removing long-term redundancy and short-term redundancy that are inherently included in an audio signal by combining, in parallel, a recurrent encoding/decoding model and a nonrecurrent encoding/decoding model and selectively applying different types of neural network-based encoding and decoding models based on a feature of the audio signal.

Referring to FIG. 1, an encoder 101 may encode an input signal to generate a bitstream, and a decoder 102 may decode the bitstream received from the encoder 101 to generate an output signal.

The encoder 101 and the decoder 102 may each include a processor, and the respective processors of the encoder 101 and the decoder 102 may perform an encoding method and a decoding method, respectively. The input signal described herein may be an original audio signal that is a target to be encoded and may include a plurality of frames. The output signal described herein may be a reconstructed audio signal from the encoded bitstream of the input signal by the decoder 102.

A recurrent encoding model and a recurrent decoding model may be an encoder and decoder part of autoencoder with a recurrent structure designed for signal compression and reconstruction. The recurrent autoencoder is known to be effective in removing long-term redundancy. For example, the recurrent part of the recurrent autoencoder may be implemented by adopting one of popular recurrent networks such as recurrent neural network (RNN), long short-term memory (LSTM), gated recurrent unit (GRU), and the like. In addition, each sub-network included in the recurrent autoencoder may be designed by employing a fully-connected network (FCN), a convolutional neural network (CNN), and the like.

The recurrent encoding model to encode a current frame of an input signal may be effective in removing long-term redundancy of the current frame using history information associated with previous frames of the input signal. Thus, the recurrent encoding model may result in a feature information removed the long-term redundancy from the current frame of the input signal.

The recurrent decoding model may reconstruct the current frame of the input signal using the history information associated with the previous frames of the input signal and the feature information of the current frame. The recurrent decoding model may generate an output signal from the feature information. The recurrent encoding model and the recurrent decoding model are not limited to the foregoing examples and may be various neural network models that are available to those having ordinary skill in the art.

In contrast to these recurrent models, a nonrecurrent encoding model and a nonrecurrent decoding model, each of which is a deep learning-based neural network model for effectively removing short-term redundancy in a current frame independent of previous frames of an input signal, may be an encoder and decoder part of a nonrecurrent autoencoder without a recurrent structure. For example, the nonrecurrent autoencoder may be implemented by adopting various types of autoencoder such as deterministic autoencoder, variational autoencoder (VAE), and the like. In addition, each sub-network included in the nonrecurrent autoencoder may be designed by employing an FCN, a CNN, and the like.

The nonrecurrent encoding model, which is a model configured to encode a current frame of an input signal, may encode the input signal of a current time independently of previous frames of the input signal to compute a feature information removed short-term redundancy in the current frame of the input signal.

The nonrecurrent decoding model may decode the feature information of the current frame independently of the previous frames to compute an output signal. The nonrecurrent encoding model and the nonrecurrent decoding model are not limited to the foregoing examples and may be various neural network models that are available to those having ordinary skill in the art.

A detailed method of training the recurrent encoding model, the recurrent decoding model, the nonrecurrent encoding model, and the nonrecurrent decoding model will be described hereinafter with reference to FIGS. 5A and 5B.

According to an example embodiment, the encoder 101 may compute the respective feature information of the input signal in each mode using the recurrent encoding model and the nonrecurrent encoding model, and determine an encoding mode based on the feature information for each mode and the input signal.

To determine the encoding mode, a closed-loop method or an open-loop method may be used. The encoding mode using the closed-loop method, or simply a closed-loop encoding mode, may be determined by comparing i) a loss value that is based on a difference between the input signal and an output signal computed by the recurrent encoding model and the recurrent decoding model and ii) a loss value that is based on a difference between the input signal and an output signal computed by the nonrecurrent encoding model and the nonrecurrent decoding model.

In contrast, the encoding mode using the open-loop method, or simply an open-loop encoding mode, may be determined by mode selector using a single or multiple feature parameter(s) extracted from the input signal.

The encoder 101 may transmit, to the decoder 102, a combined bitstream of the feature information and the encoding mode corresponding to the selected encoding mode.

The decoder 102 may extract the encoding mode and the feature information from the bitstream received from the encoder 101, and compute an output signal from the feature information using the nonrecurrent decoding model or the recurrent decoding model depending on the encoding mode.

The encoding mode may be different for each frame of the input signal. That is, when encoding and decoding the input signal of a current time, the encoder 101 may selectively output a bitstream for the feature information computed by the recurrent encoding model or a bitstream for the feature information computed by the nonrecurrent encoding model. The recurrent encoding model encodes the input signal of the current time using history information at the previous time step. The nonrecurrent encoding model encodes the input signal of the current time step independently of the input signal at the previous time step.

Figure 2:
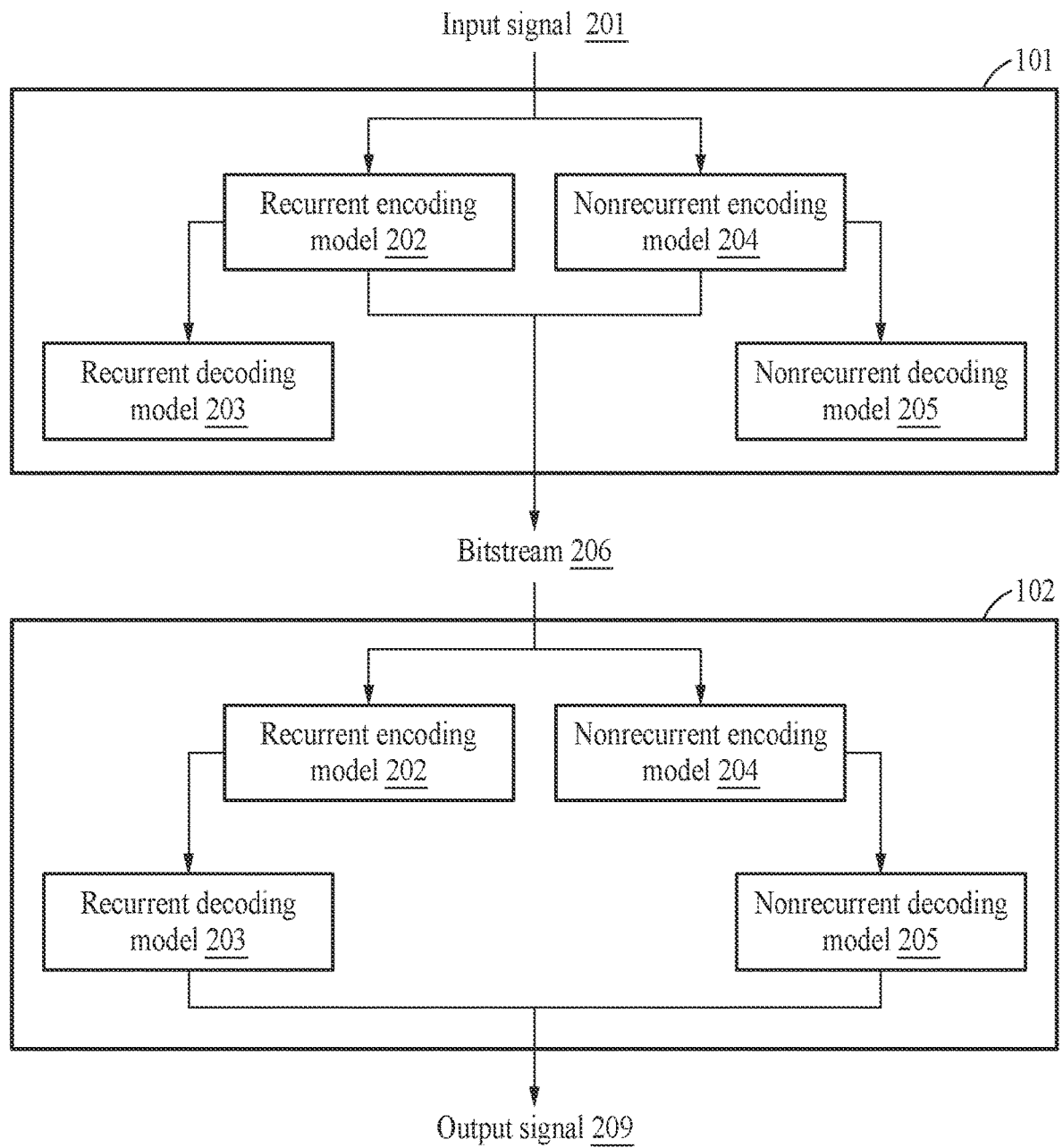
FIG. 2 is a diagram illustrating an example of a configuration of neural network models included in an encoder and a decoder according to an example embodiment.

FIG. 2 is a diagram illustrating an example of a configuration of neural network models included in an encoder and a decoder according to an example embodiment.

The encoder 101 may compute the first feature information from an input signal 201 using a recurrent encoding model 202. The first feature information may be a feature information computed by the recurrent encoding model 202.

The encoder 101 may to encode the input signal 201 in a recurrent mode using the input signal 201 at the current time step and history information at the previous time as inputs to the recurrent encoding model 202. The recurrent encoding model 202 may compute the first feature information from the input signal 201 and the history information.

The encoder 101 may produce the first feature bitstream by quantizing the first feature information computed by the recurrent encoding model 202, and reconstruct the quantized first feature information by dequantizing the feature bitstream for an input to a recurrent decoding model 203.

The encoder 101 may compute the second feature information from the input signal 201 at the current time step using a nonrecurrent encoding model 204. The second feature information may be a feature information computed by the nonrecurrent encoding model 204. The encoder 101 may feed the input signal 201 at the current time to the nonrecurrent encoding model 204 to encode the input signal 201 in a nonrecurrent mode.

The encoder 101 may produce the second feature bitstream by quantizing the second feature information computed by the nonrecurrent encoding model 204.

The encoder 101 may compute an output signal from the quantized first feature information using the recurrent decoding model 203. The encoder 101 may feed, to the recurrent decoding model 203, the quantized first feature information and the history information at the previous time step.

The first output signal used herein may be an output signal computed by using the recurrent decoding model 203. The encoder 101 may update the history information using the quantized first feature information in a process of computing the first output signal.

The encoder 101 may compute a updated history information at the current time step using the quantized first feature information and the history information at the previous time, and then compute the first output signal using the updated history information in the recurrent decoding model 203.

The updated history information at the current time step may be used as a history information for the recurrent encoding model 202 and the recurrent decoding model 203 to encode an input signal at the next time step. Thus, the recurrent encoding model 202 and the recurrent decoding model 203 of the encoder 101 may share the history information at each time step.

The encoder 101 may selectively output one of the first feature bitstream encoded in the recurrent mode and the second feature bitstream encoded in the nonrecurrent mode.

To determine an encoding mode, one of a closed-loop method and an open-loop method may be applied. In the closed-loop method, the encoding mode is selected by using two set of output and feature bitstream obtained respectively in the recurrent mode and the nonrecurrent mode, and the encoding mode is selected only on the characteristics of an input signal 201.

In the closed-loop method used to determine the encoding mode, the second output may computed from the quantized second feature information using a nonrecurrent decoding model 205. The first loss may be calculated as a weighted sum of a signal distortion between the input signal 201 and the first output signal and an entropy of the first feature information, and the second loss may be calculated as a weighted sum of a signal distortion between the input signal 201 and the second output signal and an entropy of the second feature information.

In the closed-loop method, the encoding mode may be determined by selecting mode with the smaller loss of the first loss and the second loss. The entropy term to contribute to overall loss may be calculated using a probability distribution based on a frequency of occurrence of each representative symbol when quantizing a feature information, and may indicate a lower bound of number of bits required for an actual conversion to a bitstream. Such an entropy may be included in overall loss to limit a bit rate of the encoder 101.

When the first loss is greater than the second loss in the closed-loop method, the encoder 101 may judge that the performance in terms of reconstruction quality and bit rate in nonrecurrent mode is better than in the recurrent mode, and may transmit the second bitstream 206 corresponding to the second feature information and the selected encoding mode to the decoder 102. In contrast, when the first loss is less than the second loss, the encoder 101 may judge that the performance in terms of reconstruction quality and bit rate in recurrent mode is better than in the nonrecurrent mode, and transmit a bitstream 206 corresponding to the first feature information and the selected encoding mode to the decoder 102.

In the open-loop method, the encoding mode may be determined by using feature parameter(s) reflecting the characteristics of input signal. That is, the mode selector may discriminate which one of long-term and short-term redundancy is dominant inherently in the input signal 201 using the feature parameter(s).

The mode select may extract single or multiple feature parameters from an input signal and then determine the encoding mode to be one of the recurrent mode and the nonrecurrent mode based on the feature parameters.

For example, a frame energy, a frame zero-crossing rate (ZCR), a pitch delay, a gain of long-term prediction filter, and the like may be used as feature parameter(s) for open-loop mode selection. A linear or nonlinear classifier such as neural network, support vector machine (SVM), and the like may be used as the discriminator for those feature parameters.

When an output of the classifier corresponds to the nonrecurrent mode in the open-loop method, the encoder 101 may transmit the bitstream 206 corresponding to the second feature information and the selected encoding mode to the decoder 102. In contrast, when the output of the classifier corresponds to the recurrent mode, the encoder 101 may transmit the bitstream 206 corresponding to the first feature information and the selected encoding mode to the decoder 102. The decoder 102 may receive the bitstream 206, and extract the encoding mode and reconstruct the quantized feature information from the bitstream 206. The quantized feature information may be identified to one of the first and the second feature information depending on the extracted encoding mode.

When the encoding mode is the nonrecurrent mode, the decoder 102 may compute an output signal 209 from the quantized feature information using a nonrecurrent decoding model 205 in the decoder 102. When the encoding mode is the nonrecurrent mode, the quantized feature information may be the second feature information computed by the nonrecurrent encoding model 204 in the encoder 101.

When the encoding mode is the recurrent mode, the decoder 102 may compute an output signal 209 from the quantized feature information using a recurrent decoding model 203 in the decoder. When the encoding mode is the recurrent mode, the quantized feature information may be the first feature information computed by the recurrent encoding model 202 in the encoder 101.

The recurrent decoding model 203 in the decoder 102 may compute the updated history information at the current time step using the history information at the previous time step and the feature information of the input signal 201, and compute the output signal 209 from the updated history information. The updated history information may be stored to decode a feature information using the recurrent decoding model 203 of the decoder 102 at the next time step.

The encoding mode may switch at each time step. For example, assuming that encoding modes at time steps {t−1, t, t+1} are {recurrent, nonrecurrent, recurrent}, a history information in the encoder 101 may be updated through the recurrent decoding model 203 at each time step. However, a history information of the recurrent decoding model 203 in the decoder 102 may not be updated because the decoder 102 decodes the quantized feature information at the time step t through the nonrecurrent decoding model 205 in the decoder.

Thus, a mismatch in history information between recurrent neural networks of the encoder 101 and the decoder 102 may occur, and the history information updated at the time step t−1 may be used to decode the quantized feature information at the time step t+1.

Thus, to prevent such a mismatch in history information, when the encoding mode is the nonrecurrent mode, the output signal 209 computed using the nonrecurrent decoding model 203 in the decoder may be fed to the recurrent encoding model 202 to compute the first feature information and the first feature information may be quantized to produce the quantized first feature information. And then the history information may be updated from the quantized first feature information and the history information using the recurrent decoding model 203 in the decoder.

Figure 3A:
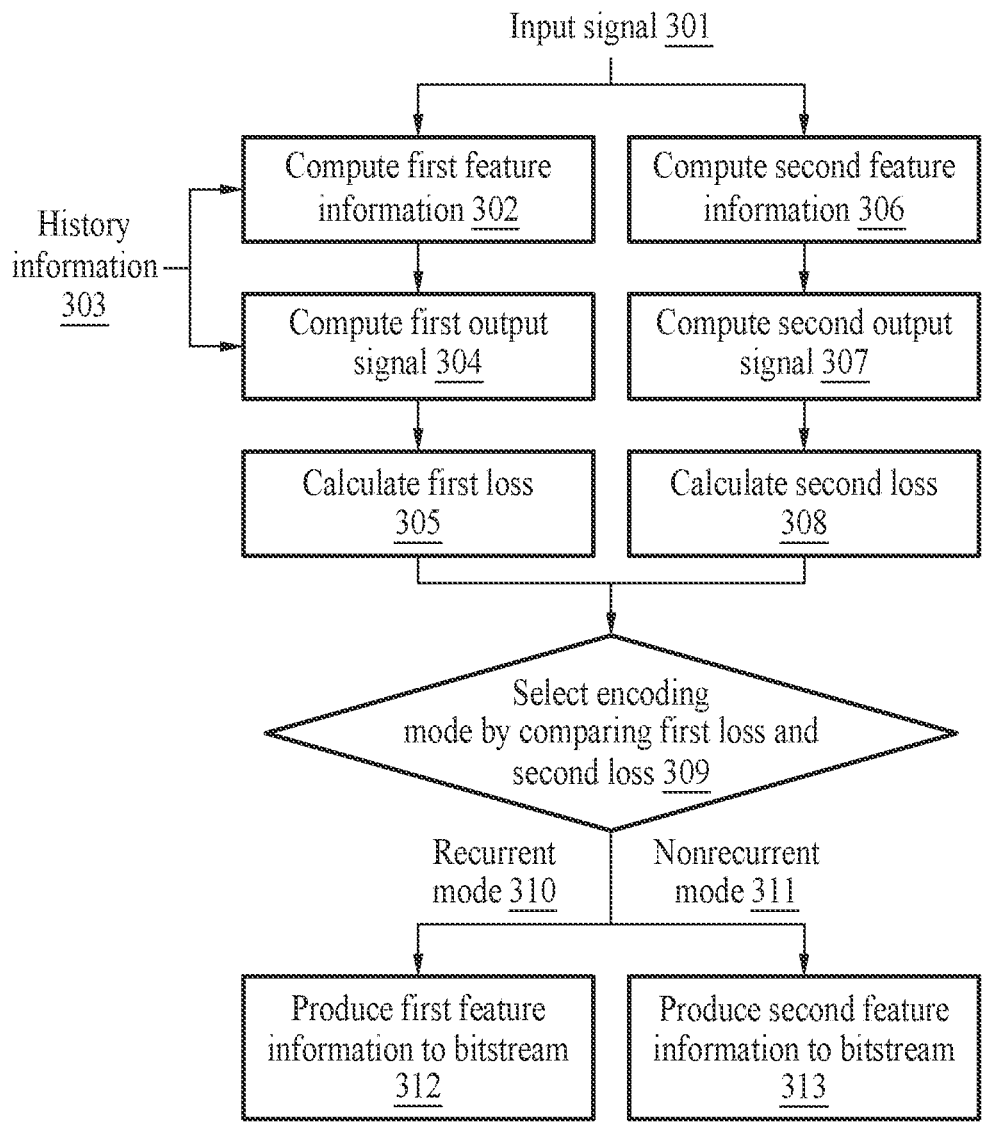
FIGS. 3A and 3B are flowcharts illustrating examples of an encoding method using a neural network model according to example embodiments.
Figure 3B:
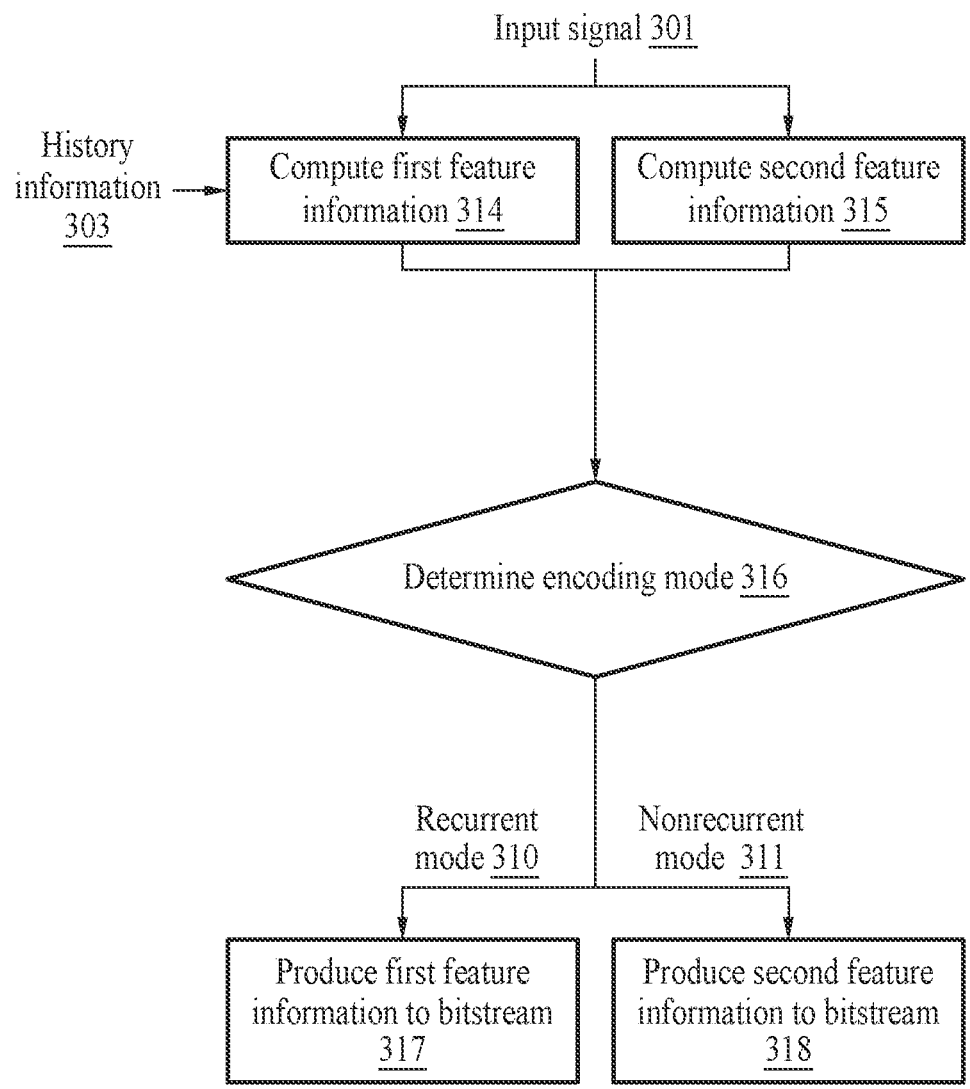

FIGS. 3A and 3B are flowcharts illustrating examples of an encoding method using a neural network model according to example embodiments.

In the example of FIGS. 3A and 3B, an input signal 301 may be a frame of a predefined number of samples at a specific time step t. An overlap interval may exist across the frames. The encoder may operate on a frame-by-frame basis.

FIG. 3A is a flowchart illustrating an example of an encoding method on a closed-loop mode selection method. An encoder may perform operations 302 and 306 using a recurrent encoding model and a nonrecurrent encoding model.

In operation 302, the encoder may compute the first feature information of the input signal 301 by feeding a history information 303 and the input signal 301 to the recurrent encoding model, and then quantize the first feature information. The recurrent encoding model may compute the first feature information using the history information 303 and the input signal 301.

In operation 304, the encoder may compute the first output signal using a recurrent decoding model. During the operation 304, the encoder may update the history information from the quantized first feature information and the history information 303 using the recurrent decoding model, and compute the first output signal from the updated history information. The updated history information may be stored for encoding and decoding an input signal at the next time step.

In operation 305, the encoder may calculate the first loss as a weighted sum of a signal distortion between the first output signal and the input signal 301 and an entropy of the first feature information.

In operation 306, the encoder may compute the second feature information of the input signal 301, and the quantize the second feature information. The encoder may compute the second feature information by feeding the input signal 301 to the nonrecurrent encoding model.

In operation 307, the encoder may compute the second output signal using a nonrecurrent decoding model. The encoder may compute the second output signal by feeding the quantized second feature information to the nonrecurrent decoding model.

In operation 308, the encoder may calculate the second loss as a weighted sum of a signal distortion between the second output signal and the input signal 301 and an entropy of the second feature information.

In operation 309, the encoder may compare the first loss and the second loss, and select the encoding mode with the smaller value. For example, when the first loss is greater than the second loss, the encoder may judge that the performance in terms of reconstruction quality and bit rate in nonrecurrent mode is better than in the recurrent mode, and may set the encoding mode to nonrecurrent mode 311. In contrast, when the first loss is less than the second loss, the encoder may judge that the performance in terms of reconstruction quality and bit rate in recurrent mode is better than in the nonrecurrent mode, and may set the encoding mode to recurrent mode 310.

In operation 312, when the encoding mode is the recurrent mode 310, the encoder may produce the first feature bitstream of the quantized first feature information computed by the recurrent encoding model. The encoder may output a combined bitstream of the first feature bitstream and an encoding mode bit.

In operation 313, when the encoding mode is the nonrecurrent mode 311, the encoder may produce the second feature bitstream of the quantized second feature information computed by the nonrecurrent encoding model. The encoder may output a combined bitstream of the second feature bitstream and an encoding mode bit.

FIG. 3B is a flowchart illustrating an example of an encoding method on an open-loop mode selection method. In operation 314, the encoder may compute the first feature information of an input signal 301 by feeding the input signal 301 and the history information 303 to the recurrent encoding model, and quantize the first feature information.

In operation 315, the encoder may compute the second feature information of the input signal 301, and quantize the second feature information. The encoder may compute the second feature information by feeding the input signal 301 to the nonrecurrent encoding model.

In operation 316, the encoder may determine the encoding mode based on various feature parameters related to characteristics of the input signal 301, and select the quantized feature information computed by one of recurrent mode and nonrecurrent mode as an output of the encoder depending on the selected encoding mode. The open-loop method may not require a reconstructed output signal, and thus operations 304, 305, 307, and 308 described above with reference to FIG. 3A may be omitted from the encoding method described with reference to FIG. 3B.

In operation 317, when the encoding mode is a recurrent mode 310, the encoder may produce the first feature bitstream of the quantized first feature information computed by the recurrent encoding model. The encoder may output a combined bitstream of the first feature bitstream and an encoding mode bit.

In operation 318, when the encoding mode is a nonrecurrent mode 311, the encoder may produce the second feature bitstream of the quantized second feature information computed by the nonrecurrent encoding model. The encoder may output a combined bitstream of the second feature bitstream and an encoding mode bit.

Figure 4:
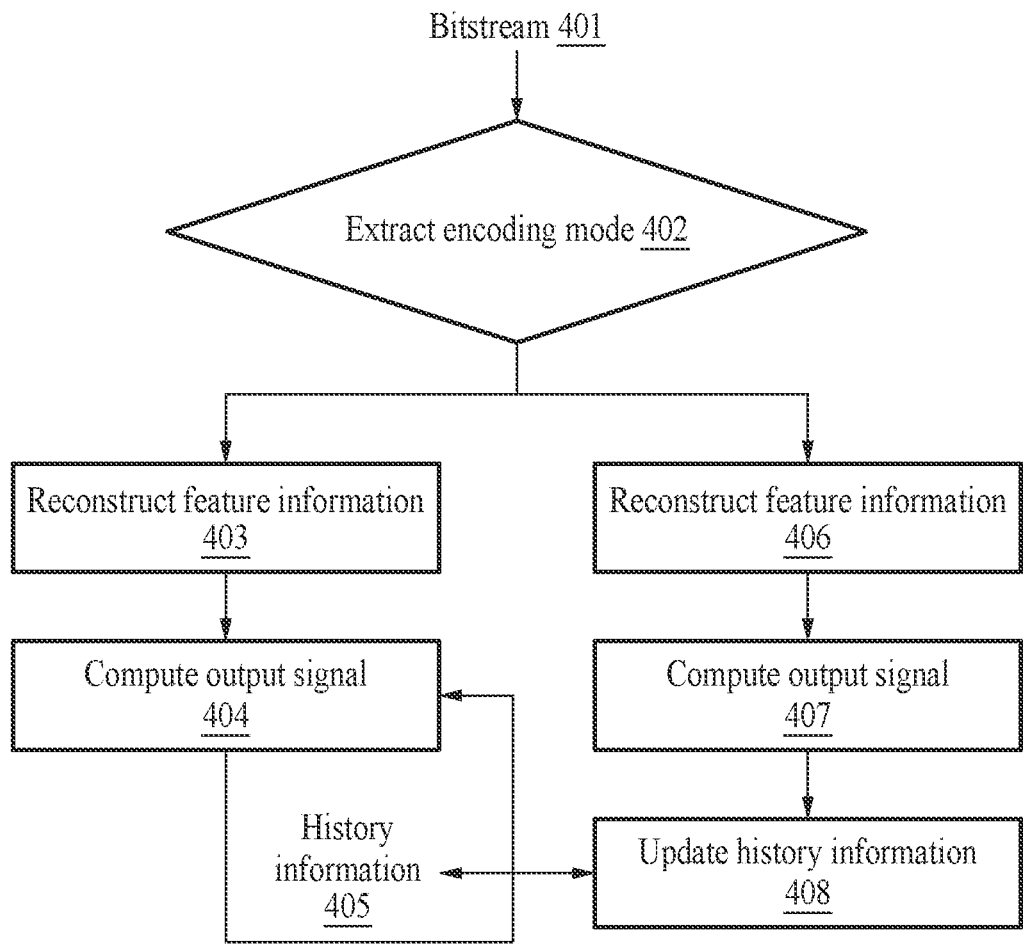
FIG. 4 is a flowchart illustrating an example of a decoding method using a neural network model according to an example embodiment.

FIG. 4 is a flowchart illustrating an example of a decoding method using a neural network model according to an example embodiment.

In operation 402, a decoder may extract an encoding mode from a bitstream 401 received from an encoder. When the encoding mode is a recurrent mode, the bitstream 401 may include a bitstream of the first feature information computed by a recurrent encoding model of the encoder. When the encoding mode is a nonrecurrent mode, the bitstream 401 may include a bitstream of the second feature information computed by a nonrecurrent encoding model of the encoder.

In operation 403, when the encoding mode is the recurrent mode, the decoder may reconstruct the quantized feature information from the bitstream 401. The quantized feature information may be the first feature information computed by the recurrent encoding model of the encoder.

In operation 404, when the encoding mode is the recurrent mode, the decoder may compute the first output signal from the quantized first feature information using a recurrent decoding model. The decoder may update a history information 405 using the history information 405 and the quantized first feature information, and compute the first output signal using the updated history information. The updated history information may be stored for decoding at the next time step.

In operation 406, when the encoding mode is a nonrecurrent mode, the decoder may reconstruct the quantized feature information from the bitstream 401. The quantized feature information may be the second feature information computed by the nonrecurrent encoding model of the encoder.

In operation 407, when the encoding mode is the nonrecurrent mode, the decoder may compute the second output signal from the quantized second feature information using a nonrecurrent decoding model.

In operation 408, when the encoding mode is the nonrecurrent mode, the decoder may update a history information to synchronize the history information for the recurrent mode with the encoder. The decoder may compute the first feature information from the second output signal using the recurrent encoding model, quantize the first feature information, and then update the history information from the quantized the first feature information and the history information 405 using the recurrent decoding model.

The decoder may output the first output signal or the second output signal according to the encoding mode at each time step.

Figure 5A:
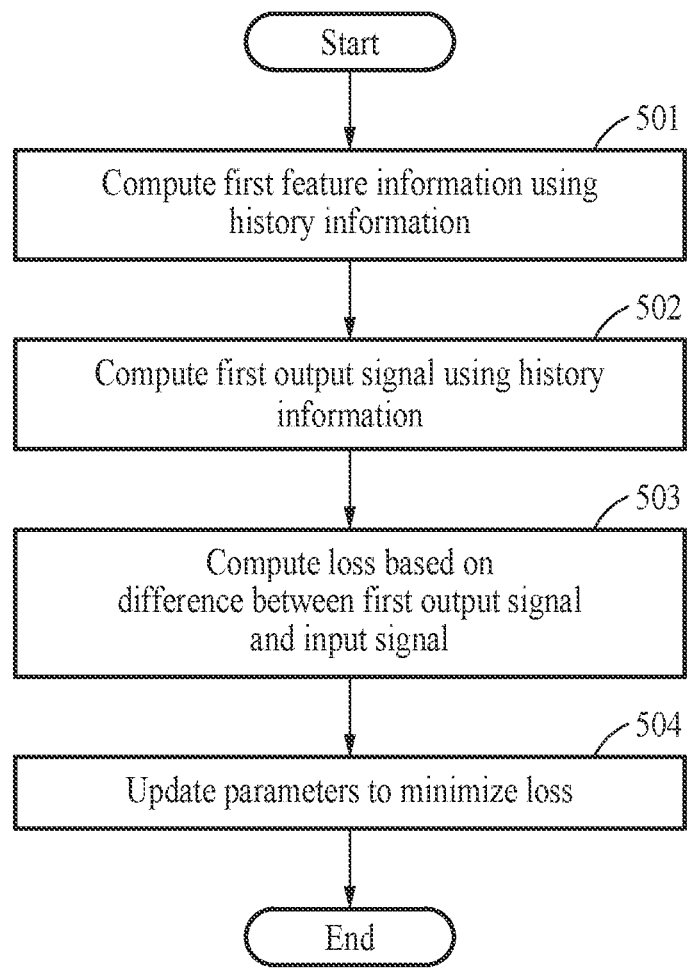
FIGS. 5A and 5B are flowcharts illustrating examples of a method of training a neural network model according to example embodiments.
Figure 5B:
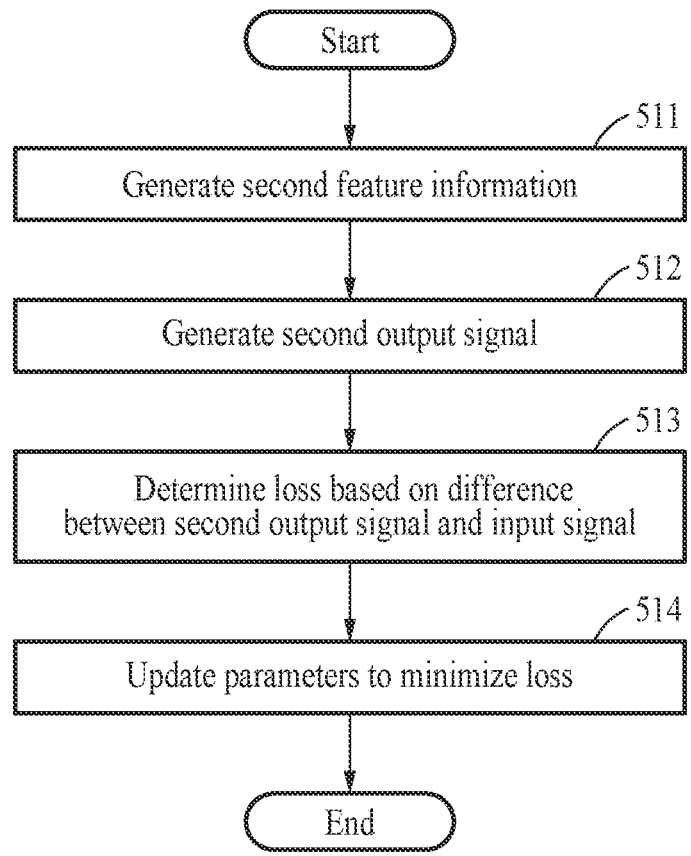

FIGS. 5A and 5B are flowcharts illustrating examples of a method of training a neural network model according to example embodiments. FIG. 5A is a flowchart illustrating an example of a method of training a recurrent encoding model and a recurrent decoding model.

To train a recurrent neural network model, each audio material in an audio database may be divided into multiple frames consisting of N consecutive audio samples, and then frames are arranged into multiple groups of temporally-consecutive T frames. Groups of the T frames may then be grouped randomly into multiple set of B groups. The training process for the recurrent neural network model may be performed iteratively on B frames corresponding to each time step in the set of (B×T) frames. The B frames corresponding to each time step may be referred as to batch. In addition, a history information for the recurrent encoding model and the recurrent decoding model may be initialized to a preset value, for example, zeros.

In operation 501, the first feature information of an input batch at the time step t may be computed by feeding the input batch of the time step t and the history information to the recurrent encoding model. The history information and the first feature information may be an one-dimensional (1D) vector, a two-dimensional (2D) matrix, or a multi-dimensional tensor for each frame in the input batch depending on a structure of a recurrent neural network. For the convenience of description, the history information and the feature information may be assumed to be processed on a unit of batch in the training process. In general, a quantization process may be a non-differentiable operation, and thus model parameters may not be updated using error backpropagation required in the training process. Thus, in the training process, a relaxed quantization method such as softmax quantization, may be applied to quantize the first feature information.

In operation 502, an encoder or decoder may compute the first output batch using the recurrent decoding model. The encoder may compute the first output batch from the quantized first feature information and the history information. In detail, the recurrent decoding model may compute the current history information using the quantized first feature information and the previous history information, and then compute the first output batch from the current history information.

In operation 503, the encoder or decoder may compute the first loss function for updating the model parameters of the recurrent encoding and decoding models as a weighted sum of a signal distortion measured between the first output batch and the input batch and an entropy loss corresponding to an estimated number of bits required to encode the first feature information. The signal distortion may be measured using norm-based method such as mean squared error (MSE).

In operation 504, the encoder or decoder may update model parameters of the recurrent encoding and decoding models such that the first loss function is minimized. For example, the model parameters of the recurrent encoding and decoding models may be updated through error backpropagation based on the first loss function.

The encoder or decoder may iterate operations 501 through 504 on batch at every time step, for example, from t=0 to t=T−1.

The encoder or decoder may iteratively perform on multiple epochs until the recurrent encoding and decoding models are sufficiently trained.

FIG. 5B is a flowchart illustrating an example of a method of training a nonrecurrent encoding model and a nonrecurrent decoding model.

To train a nonrecurrent neural network model, each audio material in an audio database may be divided into multiple frames of N consecutive audio samples, and then frames may be arranged randomly into multiple groups of B frames. The training process for the nonrecurrent neural network model may be iteratively performed on a group of B frames, which is referred as to batch. Each batch may be fed to the nonrecurrent neural network model in a random order.

In operation 511, the second feature information of an input batch may be computed and quantized. The second feature information may be computed by feeding the input batch to the nonrecurrent encoding model. The second feature information may be an 1D vector, 2D matrix, or multi-dimensional tensor for each frame in the input batch depending on a structure of a nonrecurrent neural network. For the convenience of description, the feature information may be assumed to be processed on a unit of batch in the training process. In general, a quantization process may be an non-differentiable operation, and thus model parameters may not be updated using error backpropagation required in the training process. Thus, in the training process, a relaxed quantization method such as softmax quantization, may be applied to quantize the second feature information.

In operation 512, an encoder or decoder may compute the second output batch using the nonrecurrent decoding model. The second output batch may be computed by feeding the quantized second feature information to the nonrecurrent decoding model.

In operation 513, the encoder or decoder may calculate the second loss function for updating the model parameters of the nonrecurrent encoding and decoding model as a weighted sum signal distortion measured between the second output batch and the input batch and an entropy loss to encode the second feature information. The signal distortion may be calculated using norm-based method such as MSE.

In operation 514, the encoder or decoder may update model parameters of the nonrecurrent encoding and decoding models such that the second loss function is minimized. For example, the model parameters of the nonrecurrent encoding and decoding models may be updated through error backpropagation based on the second loss function.

The encoder or decoder may iterate operations 511 through 514 on multiple epochs until the nonrecurrent encoding and decoding models are sufficiently trained.

According to example embodiments described herein, it is possible to effectively remove long-term redundancy and short-term redundancy when encoding and decoding an audio signal.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of encoding an audio signal, the method comprising:
   computing first feature information of an input signal using a recurrent encoding model wherein the input signal includes at least one of long-term redundancy and short-term redundancy;
   quantizing the first feature information and producing a first feature bitstream;

computing the first output signal from quantized first feature information using a recurrent decoding model;

computing a second feature information of the input signal using a nonrecurrent encoding model;

quantizing the second feature information and producing a second feature bitstream;

computing the second output signal from quantized second feature information using a nonrecurrent decoding model;

determining an encoding mode based on the input signal, the first output signal, the second output signal, the first feature bitstream, and the second feature bitstream; and outputting an overall bitstream by multiplexing an encoding mode bit and one of the first feature bitstream and the second feature bitstream depending on the encoding mode, wherein the first feature information is obtained by removing the long-term redundancy from the input signal, wherein the second feature information is obtained by removing the short-term redundancy from the input signal, wherein the first output signal and the second output signal are input signals reconstructed according to different decoding models;

wherein the determining of the encoding mode comprises:

determining a first loss based on the input signal, the first output signal, and the first feature bitstream;

determining a second loss based on the input signal, the second output signal, and the second feature bitstream; and comparing the first loss and the second loss, setting the encoding mode to a nonrecurrent mode when the first loss is greater than the second loss, and setting the encoding mode to a recurrent mode when the first loss is less than the second loss.

2. The method of claim 1, wherein the recurrent encoding model is configured to encode the input signal using history information stored at the previous time step, and the recurrent decoding model is configured to decode the quantized first feature information using the history information at the previous time step.

3. The method of claim 2, wherein the recurrent decoding model is configured to update the history information using the quantized first feature information, compute the first output signal using the updated history information, and store the updated history information for encoding at the next time step.

4. The method of claim 1, wherein determining the first loss comprises:

calculating signal distortion between the input signal and the first output signal; and calculating a weighted sum of the signal distortion and a number of the first feature bitstream in bits.

5. The method of claim 1, wherein determining the second loss comprises:

calculating signal distortion between the input signal and the second output signal; and calculating a weighted sum of the signal distortion and a number of the second feature bitstream in bits.

6. The method of claim 1, wherein the outputting of the overall bitstream comprises:

when the encoding mode is a recurrent mode, multiplexing the first feature bitstream and the encoding mode bit and outputting a result of the multiplexing; and when the encoding mode is a nonrecurrent mode, multiplexing the second feature bitstream and the encoding mode bit and outputting a result of the multiplexing.

7. A method of decoding an audio signal, the method comprising:

reconstructing, depending on an encoding mode extracted from a bitstream that includes an audio signal, quantized feature information by dequantizing the bitstream; and computing an output audio signal from the quantized feature information using a decoding model selected based on the encoding mode;

wherein, when the encoding mode is a nonrecurrent mode, the selected decoding model is a nonrecurrent decoding model;

updating history information previously stored by encoding and decoding the output audio signal of the nonrecurrent decoding model using a recurrent encoding model and a recurrent decoding model;

obtaining the feature information by removing at least one of long-term redundancy using the recurrent decoding model and short-term redundancy using the nonrecurrent decoding model from the input audio signal;

wherein the output audio signal is a reconstructed input audio signal;

wherein computing the output audio signal comprises:

when the encoding mode is a recurrent mode during a first time step, computing the output audio signal from the quantized feature information using the recurrent decoding model during the first time step; and when the encoding mode is the nonrecurrent mode during a second time step, computing the output audio signal from the quantized feature information using the nonrecurrent decoding model during the second time step and updating history information from the quantized feature information and the history information using the recurrent decoding model to prevent mismatch in history information between the first time step and a third time step subsequent to the second time step.

8. The method of claim 7, wherein the recurrent decoding model is configured to update the history information stored at the previous time step using the quantized feature information, compute the output audio signal using the updated history information, and store the updated history information for decoding at the next time step.

9. The method of claim 7, wherein computing the output audio signal comprises, when the encoding mode is the nonrecurrent mode, computing the output signal from the quantized feature information using the nonrecurrent decoding model.

10. The method of claim 7, wherein updating the history information comprises:

when the encoding mode is the nonrecurrent mode, computing feature information of an output audio signal computed using the nonrecurrent decoding model, using the recurrent encoding model;

quantizing the feature information;

updating the history information from the quantized feature information using the recurrent decoding model; and storing the updated history information for decoding at the next time step.

11. An encoder comprising:
a processor configured to:
compute first feature information of an input signal using a recurrent encoding model wherein the input signal includes at least one of long-term redundancy and short-term redundancy;
quantize the first feature information and produce a first feature bitstream;
compute a first output signal from quantized first feature information using a recurrent decoding model;
compute a second feature information of the input signal using a nonrecurrent encoding model;
quantize the second feature information and produce a second feature bitstream;
compute a second output signal from quantized second feature information using a nonrecurrent decoding model;
determine an encoding mode based on the input signal, the first output signal, the second output signal, the first feature bitstream, and the second feature bitstream; and
output an overall bitstream by multiplexing an encoding mode bit and one of the first feature bitstream and the second feature bitstream depending on the encoding mode,
wherein the first feature information is obtained by removing the long-term redundancy from the input signal,
wherein the second feature information is obtained by removing the short-term redundancy from the input signal,
wherein the first output signal and the second output signal are input signals reconstructed according to different decoding models;
wherein the processor is configured to:
determine a first loss based on the input signal, the first output signal, and the first feature bitstream;
determine a second loss based on the input signal, the second output signal, and the second feature bitstream; and
compare the first loss and the second loss, and set the encoding mode to a nonrecurrent mode when the first loss being is greater than the second loss and set the encoding mode to a recurrent mode when the first loss is less than the second loss.

12. The encoder of claim 11, wherein the recurrent encoding model is configured to encode the input signal using history information stored at the previous time step, and
the recurrent decoding model is configured to decode the quantized first feature information using the history information at the previous time step.

13. The encoder of claim 12, wherein the recurrent decoding model is configured to update the history information using the quantized first feature information, compute the first output signal using the updated history information, and store the updated history information for encoding at the next time step.

14. The encoder of claim 11, wherein the processor is configured to:
calculate signal distortion between the input signal and the first output signal; and
determine the first loss by a weighted sum of the signal distortion and a number of the first feature bitstream in bits.

15. The encoder of claim 11, wherein the processor is configured to:
calculate signal distortion between the input signal and the second output signal; and
determine the second loss by a weighted sum of the signal distortion and a number of the second feature bitstream in bits.

16. The encoder of claim 11, wherein the processor is configured to:
when the encoding mode is a recurrent mode, output the overall bitstream by multiplexing the first feature bitstream and the encoding mode bit; and
when the encoding mode is a nonrecurrent mode, output the overall bitstream by multiplexing the second feature bitstream and the encoding mode bit.

* * * * *